United States Patent
Parlaker

(10) Patent No.: US 11,605,155 B2
(45) Date of Patent: Mar. 14, 2023

(54) METHOD, PROCESSING SYSTEM AND COMPUTER PROGRAM FOR PROCESSING AN IMAGE

(71) Applicant: Vestel Elektronik Sanayi ve Ticaret A.S., Manisa (TR)

(72) Inventor: Mehmet Emre Parlaker, Manisa (TR)

(73) Assignee: VESTEL ELEKTRONIK SANAYI ve TICARET A.S., Manisa (TR)

( * ) Notice: Subject to any disclaimer, the term of this patent is extended or adjusted under 35 U.S.C. 154(b) by 0 days.

(21) Appl. No.: 16/649,921

(22) PCT Filed: Dec. 28, 2017

(86) PCT No.: PCT/EP2017/084722
§ 371 (c)(1),
(2) Date: Mar. 23, 2020

(87) PCT Pub. No.: WO2019/057320
PCT Pub. Date: Mar. 28, 2019

(65) Prior Publication Data
US 2020/0279353 A1    Sep. 3, 2020

(30) Foreign Application Priority Data
Sep. 25, 2017    (EP) .................... 17192989

(51) Int. Cl.
*G06T 5/00*    (2006.01)
*G06T 7/90*    (2017.01)
*G06T 7/00*    (2017.01)

(52) U.S. Cl.
CPC .............. *G06T 5/003* (2013.01); *G06T 5/008* (2013.01); *G06T 7/90* (2017.01); *G06T 7/97* (2017.01);
(Continued)

(58) Field of Classification Search
CPC ........... G06T 5/003; G06T 5/008; G06T 7/90; G06T 7/97; G06T 2207/10016; G06T 2207/10024; G06T 2207/30196
See application file for complete search history.

(56) References Cited

U.S. PATENT DOCUMENTS

| 5,602,939 A | 2/1997 | Hashiguchi et al. |
| 8,432,498 B2 | 4/2013 | Chiang |

(Continued)

FOREIGN PATENT DOCUMENTS

| EP | 2216987 A2 | 8/2010 |
| GB | 2489233 A | 9/2012 |

(Continued)

OTHER PUBLICATIONS

Arici, et al., "Skin-Aware Local Contrast Enhancement," 2007 IEEE International Conference on Image Processing, Sep. 16-Oct. 19, 2007, pp. 521-524 (4 pages).
(Continued)

*Primary Examiner* — Michael J Vanchy, Jr.
(74) *Attorney, Agent, or Firm* — J. Miguel Hernandez; James R. Gourley; Carstens, Allen & Gourley, LLP

(57) ABSTRACT

In a method of processing an image formed of pixels, skin tone pixels in the image are detected. Local sharpening is applied to at least some of the skin tone pixels. The image is regenerated using the locally sharpened skin tone pixels.

13 Claims, 2 Drawing Sheets

(52) U.S. Cl.
CPC .............. *G06T 2207/10016* (2013.01); *G06T 2207/10024* (2013.01)

(56) References Cited

U.S. PATENT DOCUMENTS

| | | | |
|---|---|---|---|
| 9,374,478 B1* | 6/2016 | Li | H04N 1/6072 |
| 2002/0110282 A1* | 8/2002 | Kraft | H04N 1/4092 |
| | | | 382/261 |
| 2005/0286793 A1* | 12/2005 | Izumi | G06T 5/003 |
| | | | 382/263 |
| 2006/0034512 A1* | 2/2006 | Sheraizin | H04N 1/4092 |
| | | | 382/173 |
| 2008/0137952 A1* | 6/2008 | Kokemohr | G06F 3/04845 |
| | | | 382/173 |
| 2008/0298704 A1* | 12/2008 | Nachlieli | G06T 5/003 |
| | | | 382/254 |
| 2015/0221087 A1* | 8/2015 | Houjou | G06T 5/20 |
| | | | 382/128 |
| 2016/0048949 A1* | 2/2016 | Peng | G06T 5/20 |
| | | | 382/162 |
| 2018/0096467 A1* | 4/2018 | Chesnokov | G06T 5/50 |

FOREIGN PATENT DOCUMENTS

| | | | | |
|---|---|---|---|---|
| JP | H11298829 A | 10/1999 | | |
| JP | 2010193099 A | 9/2010 | | |
| JP | 2011215624 A | 10/2011 | | |
| JP | 2012238135 A | 12/2012 | | |
| WO | WO-2010050914 A1 * | 5/2010 | ............ | G06T 5/008 |
| WO | 2010/138121 A1 | 12/2010 | | |

OTHER PUBLICATIONS

Sid-Ahmed et al., "Selective color tone adjustment for advanced television systems," IEEE Transactions on Consumer Electronics, Nov. 1994, pp. 938-943 (6 pages).
English machine translation of Japanese Application No. JP2010193099A published on Sep. 2, 2010 (33 pages).
English machine translation of Japanese Application No. JP2011215624A published on Oct. 27, 2011 (23 pages).
English machine translation of Japanese Application No. JP2012238135A published on Dec. 6, 2012 (24 pages).
English machine translation of Japanese Application No. JPH11298829A published on Oct. 29, 1999 (18 pages).

* cited by examiner

| - | - | $C_6$ | - | - |
|---|---|---|---|---|
| $C_4$ | $C_2$ | $C_5$ | $C_2$ | $C_4$ |
| $C_3$ | $C_1$ | $C_0$ | $C_1$ | $C_3$ |
| $C_4$ | $C_2$ | $C_5$ | $C_2$ | $C_4$ |
| - | - | $C_6$ | - | - |

METHOD, PROCESSING SYSTEM AND COMPUTER PROGRAM FOR PROCESSING AN IMAGE

CROSS REFERENCE TO RELATED APPLICATION

This application is a US 371 application from PCT/EP2017/084722 entitled "Method, Processing System and Computer Program for Processing an Image" filed on Dec. 28, 2017 and published as WO 2019/057320 A1 on Mar. 28, 2019, which claims priority to EP Application 17192989.6 filed on Sep. 25, 2017. The technical disclosures of every application and publication listed in this paragraph are hereby incorporated herein by reference.

TECHNICAL FIELD

The present disclosure relates to a method, a processing system and a computer program for processing an image.

BACKGROUND

In image processing, for example processing of still images or processing of images that make up a video sequence, various processing steps are commonly carried out in an attempt to make the image that is displayed on a display device more attractive or appealing or realistic to viewers. However, many processing steps introduce unwanted artefacts, which can spoil the image or make the image, or at least portions of the image, less realistic or appealing to viewers.

SUMMARY

According to a first aspect disclosed herein, there is provided a computer-implemented method of processing an image formed of pixels, the method comprising:
 detecting skin tone pixels in the image;
 applying local sharpening to at least some of the skin tone pixels; and
 regenerating the image using the locally sharpened skin tone pixels.

By applying local sharpening to the skin tone pixels, details in skin areas can be better preserved or enhanced, resulting in a more realistic or attractive image that is presented for display on a display device.

The method has particular application in processing of video images that are the subject of high dynamic range (HDR) processing in the playback or other related device. HDR processing can result in unwanted artefacts in skin tone regions that are particularly noticeable or visible to viewers. Examples described herein help minimise or remove the effect of such artefacts. Nevertheless, examples of the method are not limited to images that are the subject of high dynamic range (HDR) processing and may also be applied to images that are the subject of standard dynamic range (SDR) processing.

The image may be a still image. The image may be an image of a video, which is formed of plural images.

The method may be carried out in an image or video playback device, such as for example a television set, a smartphone, or a computer, such as a laptop or desktop or tablet computer, etc. The method may be carried out in some other related device that provides or generates the image, such as a DVD player, a set-top box, or a separate video processing or graphics card or the like. The method may be carried out in real-time in an image or video playback device at the time of playback.

The details of the specific processes, algorithms, filters, etc. which may be used in examples may be set or tailored depending on for example the processing capacity of the processor of the like that is implementing the method and/or the display device on which the image is displayed. The method may be implemented in software or hardware or a combination of software and hardware.

In an example, the local sharpening is applied to all of the skin tone pixels.

In an example, the regenerated image consists of the locally sharpened skin tone pixels and the original non-skin tone pixels.

In an example, the applying local sharpening to at least some of the skin tone pixels comprises applying an anti-aliasing filter to the at least some of the skin tone pixels.

In an example, the applying local sharpening to at least some of the skin tone pixels comprises applying a sharpener filter to the at least some of the skin tone pixels.

In an example, the skin tone pixels comprise separate sub-pixels and the applying local sharpening to at least some of the skin tone pixels comprises applying the local sharpening separately to each sub-pixel of the least some of the skin tone pixels.

The sub-pixels may be for example for different colours of the pixel. For example, there may be red, green and blue sub-pixels for each pixel. In this example, the different coloured sub-pixels are treated separately.

In an example, the method comprises applying local contrast enhancement to the skin tone pixels prior to applying local sharpening to the at least some of the skin tone pixels.

The local contrast enhancement may be applied for high dynamic range (HDR) processing. The local contrast enhancement may for example use a histogram approach.

In an example, the method comprises adjusting colour of the skin tone pixels prior to applying local sharpening to the at least some of the skin tone pixels.

The adjusting the colour of the skin tone pixels may be applied for high dynamic range (HDR) processing. The adjusting the colour of the skin tone pixels may comprise adjusting the hue and saturation of the skin tone pixels. The adjusting the colour of the skin tone pixels may use tone mapping.

According to a second aspect disclosed herein, there is provided a processing system for processing an image formed of pixels, the processing system being constructed and arranged to:
 detect skin tone pixels in an image formed of pixels;
 apply local sharpening to at least some of the skin tone pixels; and
 regenerate the image using the locally sharpened skin tone pixels.

The processing system may comprise at least one processor and at least one memory including computer program instructions, the at least one memory and the computer program instructions being configured, with the at least one processor, to cause the processing system at least to perform as described above.

In an example, the processing system is arranged such that the applying local sharpening to at least some of the skin tone pixels comprises applying an anti-aliasing filter to the at least some of the skin tone pixels.

In an example, the processing system is arranged such that the applying local sharpening to at least some of the skin tone pixels comprises applying a sharpener filter to the at least some of the skin tone pixels.

In an example, the processing system is arranged to apply local contrast enhancement to the skin tone pixels prior to applying local sharpening to the at least some of the skin tone pixels.

In an example, the processing system is arranged to adjust colour of the skin tone pixels prior to applying local sharpening to the at least some of the skin tone pixels.

In an example, the processing system is arranged to enable the degree of local sharpening that is applied to the at least some of the skin tone pixels to be adjusted by a user.

There is also provided a computer program comprising instructions such that when the computer program is executed on a computing device, the computing device is arranged to carry out a method as described above.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
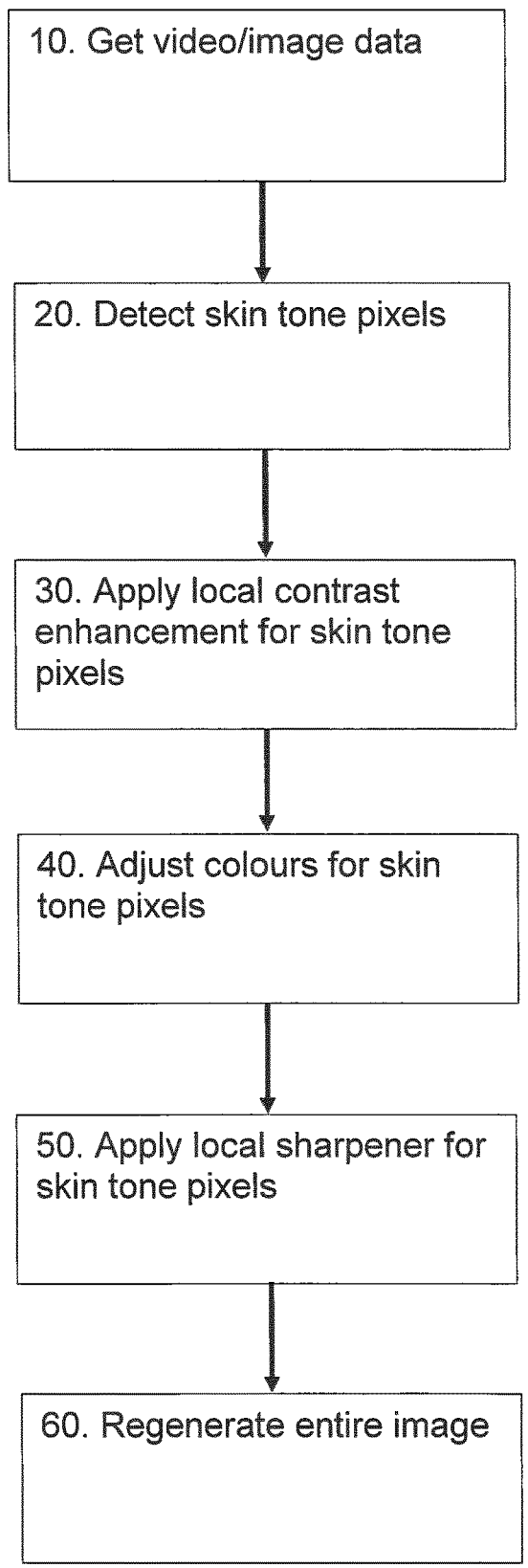
FIG. 1 shows schematically an example of a method of processing an image as described herein.

As mentioned, in image processing, for example processing of still images or processing of images that make up a video sequence, many processing steps introduce unwanted artefacts, which can spoil the image or make the image, or at least portions of the image, less realistic or appealing to viewers. The presence of artefacts or unrealistic portions of an image is particularly noticeable to viewers when the artefacts relate to skin regions in images, especially in faces of (human) subjects in the images, but also in hands, arms, legs of subjects in the image. This is largely because the human visual perception system is particularly sensitive to skin tone regions.

As a specific example, many known image processing arrangements, particularly for processing video images, use contrast enhancement in order to enhance the contrast of the image, i.e. in simple terms to enhance the difference between dark and light portions of the image. Many known image processing arrangements also attempt to improve the colours in images that are displayed. Many known image processing arrangements also use edge enhancement to attempt to improve the "sharpness" of the image, particularly in edge regions of the image (for example, an edge of a building against a sky background, or an edge of an eyelash against a skin background).

Such processing is typically applied to the whole of the image in known arrangements. In this regard, it may be noted that for example there is so-called local contrast enhancement. However, the term "local" here is used to emphasise that the contrast enhancement process is carried out on a particular pixel based on display characteristics of neighbouring or "local" pixels: the "local" contrast enhancement in known systems is nevertheless carried out across the entirety of the image, regardless of the specific content of the image.

Whilst processing of images may be carried out in many applications, including for so-called standard definition or low resolution images, the processing may also be carried out for high definition images. The definition of what constitutes "high" definition in this regard may vary. A high definition image may be regarded as an image that has at least 720 pixels, in for example a 720p display such as a 1280×720p display. Alternatively, a high definition image may be regarded as an image that has at least 1080 pixels, in for example a 1080 display such as a 1920×1080p or a 1920×1080i display.

Processing of images can result in particular in loss of detail in skin tone regions. For example, details of wrinkles, blemishes such as moles or the like, facial hair such as eyebrows, eyelashes, beards, moustaches, etc. can be lost in such processing. This can lead to skin tone regions having an unrealistic "plastic" appearance.

Such processing presents particular problems in "high dynamic range" or HDR processing, which is now available in for example consumer products. In simple terms, HDR expands the range of both contrast and colour significantly. HDR may use for example a greater number of bits to specify the brightness of a pixel. Bright parts of the image can be made much brighter, so the image seems to have more "depth". Colours can be expanded to show more bright reds, blues and greens (and all other colours). HDR processing may use a so-called electro-optical transfer function (EOTF) to specify the brightness of a pixel that is displayed. HDR processing may use wide colour gamut (WCG) to make colours more vivid, again using for example a greater number of bits to specify the colour of a pixel. In any event, despite the purpose of HDR being to present images that are have greater contrast and more vivid colours, HDR often leads to loss of detail in images and, again, this can lead to skin tone regions in particular having an unrealistic "plastic" appearance.

In examples of a method of processing an image formed of pixels described herein, skin tone pixels in the image are detected. Local sharpening is then applied to at least some of the skin tone pixels. The image is then regenerated using the locally sharpened skin tone pixels. This helps to retain details in the skin tone regions and so make the skin tone regions more realistic to viewers. This can be carried out with a relatively small overall impact on the processing requirements as only the skin tone regions are treated in this way in examples. In examples, this also avoids introducing artefacts, such as falsely created details or edges or the like, in non-skin tone regions.

The method may be carried out in an image or video playback device, such as for example a television set, a smartphone, or a computer, such as a laptop or desktop or tablet computer, etc. The method may be carried out in some other related device that provides or generates the image, such as a DVD player, a set-top box, or a separate video processing or graphics card or the like. The details of the specific processes, algorithms, filters, etc. which may be used in examples may be set or tailored depending on for example the processing capacity of the processor of the like that is implementing the method and/or the display device on which the image is displayed. The method may be implemented in software or hardware or a combination of software and hardware. The method may be applied to any digital image, whether a low or standard definition image or a high definition image, and including for example images that are subject to HDR processing but also images that are subject to SDR processing. The method may be implemented in for example a processor that takes processed HDR data from a main video processor of a device and returns the newly processed data to the main video processor after the local sharpening of the skin tone signals has been completed. The method may be applied to images that use various different colour spaces, including for example BT.2020 (ITU-R Recommendation BT.2020, also known as Rec. 2020) and BT.709 (ITU-R Recommendation BT.709, also known as Rec. 709).

Referring now to the drawings, examples of the method will now be described. It will be understood that for many of the detailed steps, a number of different techniques are available and that details of aspects like filters and filter coefficients, etc. may be different in different applications and may also be varied within a specific application.

Referring first to FIG. 1, in outline in an example, at 10, the video or image data is obtained. The data may be obtained from one of a number of different sources, such as a DVD or Blu-Ray player, etc., a television broadcast signal (such as a terrestrial, cable or satellite broadcast), over the Internet, etc. Notably, in some examples, the image data that is obtained may already have been subject to image processing for HDR (high dynamic range) purposes. As mentioned above, HDR processing can result in unwanted effects or artefacts. A particular problem that is dealt with examples described herein is in loss of detail in skin tone regions, which can lead to skin tone regions having an unrealistic "plastic" appearance.

At 20, the skin tone pixels in the image are detected. A number of techniques for detecting skin tone are available and many different techniques are known. Skin tone detection is typically based on the colours of the individual pixels. A skin tone classifier that is trained using training images may be used for this purpose.

The next subsequent steps of the method are only applied to the skin tone pixels (or at least some of the skin tone pixels) in this example. The remaining non-skin tone pixels of the image are not subjected to the next subsequent steps of the example of the method described here. These non-skin tone pixels are preserved unchanged, and used later to construct or generate the image that has been enhanced in accordance with this method.

At 30, as an optional step, contrast enhancement is applied to the skin tone pixels. The contrast enhancement is intended to enhance the contrast of the image, i.e., in simple terms, to enhance the difference between dark and light portions of the image. The human visual perception is system is particularly sensitive to contrast/brightness, as contrast enhancement can significantly improve the perceived appearance of an image.

The contrast enhancement applied to the skin tone pixels may be local contrast enhancement, which adjusts the brightness of a pixel based on for example the brightness of neighbouring pixels (as opposed to global contrast enhancement, which considers the contrast of the image as a whole).

In contrast enhancement, some (non-linear) function is applied to a pixel to (potentially) change the brightness of the pixel. In local contrast enhancement, the parameters of the (non-linear) function change for each pixel according to features extracted from the surrounding parameters. In other words, the effect of the function changes in each pixel according to the local features of the image in local contrast enhancement.

Suitable contrast enhancement techniques that may be used include those that use so-called unsharp masking and a histogram approach. Such techniques are well known in themselves. Some specific examples are described in our EP1814078A1, EP1879147A1, EP1909227A1 and WO2007085575A1, the entire contents of which are incorporated herein by reference.

Notably, in a specific example, the contrast enhancement that is applied at 30 may be for HDR image processing purposes. As mentioned, in HDR, a greater number of bits may be used to specify the brightness of a pixel. A number of (local) contrast enhancement techniques are available to be used in order to obtain enhanced contrast in accordance with HDR.

At 40, as an optional step, the colours of the skin tone pixels are analysed and adjusted as necessary to improve the colours in the image that is displayed. Adjusting the colour of the skin tone pixels may be applied for high dynamic range (HDR) processing. The adjusting the colour of the skin tone pixels may comprise adjusting the hue and saturation of the skin tone pixels. The adjusting the colour of the skin tone pixels may use tone mapping. As known per se, tone mapping maps the colours in the image's colour volume to the (usually) smaller colour volume of the playback device or associated display device while providing the best possible picture. As a specific example, an HDR image may have a colour dynamic range of 100,000:1 whereas an ordinary television set may have a colour dynamic range of 0 to 255 (8 bits).

In many applications of this in the present example, as the pixels being processed at this point are (only) skin tone pixels, the particular colour adjustment, such as tone mapping, that is used may be such as to take this into account. For example, for skin tones, red and yellow colours are often very important in terms of producing realistic or lifelike images for the viewer and the colour adjustment process may be tuned in view of this.

Then, at 50, a local sharpener is applied to the skin tone pixels. The purpose of applying the local sharpener to (only) the skin tone pixels is so that details in the skin areas of the image can be better preserved or enhanced, resulting in a more realistic or attractive image that is presented for display on the associated display device. This helps to reduce or avoid the "plastic" appearance in skin regions which can arise as a result of other processing of the image. This includes in particular processing of the image that is for HDR purposes. Some specific examples of a local sharpener process 50 for the skin tone pixels will be described in more detail below with reference to FIG. 2.

Finally, in this example of the main processing of the image, at 60 the entire image is regenerated (i.e. a new enhanced version of the original image is generated or constructed), ready for display on the display device. The regenerated image uses the enhanced skin tone pixels that are obtained in steps 20 to 50 described above in combination with the original non-skin tone pixels. As mentioned above, the non-skin tone pixels were preserved unchanged, and are now used to construct or generate the image that has been enhanced in accordance with this method.

Accordingly, with this example method, an enhanced image is produced in which the skin regions are particularly enhanced in order to preserve or maintain details in the skin regions that can otherwise be lost during other processing of the image. Bearing in mind that skin regions are particularly noticeable to viewers, this can significantly improve the realism of the image as perceived by the viewer. This can be carried out without affecting processing of other, non-skin regions, which can be enhanced (for one or more of contrast, colour and sharpness say) without having an adverse effect on the appearance of the skin regions of the image.

Figures 2, 3:
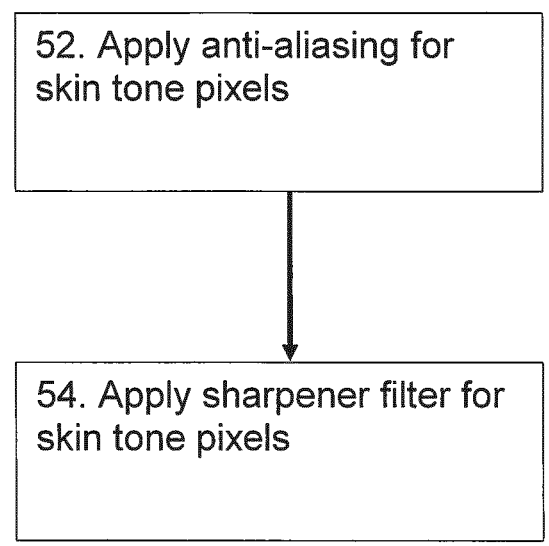
FIG. 2 shows schematically an example of a method of applying local sharpening to at least some of the skin tone pixels of an image.
FIG. 3 shows schematically an example of a filter which may be used in applying local sharpening to at least some of the skin tone pixels of an image.

Referring now to FIG. 2, in a specific example, the local sharpening process 50 which is applied to the skin tone pixels may start with applying anti-aliasing to the skin tone pixels at 52. One of the main purposes of this is to reduce the anti-aliasing in the skin regions that can arise during subsequent processing of the image (including the applying of a sharpener filter to the skin tone pixels discussed below).

As is known per se, aliasing is an effect that can arise in spatially sampled signals when the signal is sampled and quantized or reconstructed. This can occur when for example a high-resolution image is represented at a lower resolution. Aliasing typically manifests itself as rings or lines or halos in images, especially around edges in the image.

The anti-aliasing 52 may be carried out using a low pass or band pass filter to remove high frequency components from the image as it is the high frequency components that give rise to the aliasing lines, etc. which otherwise appear. The filter may be for example a 2 dimensional filter, which operates in both the horizontal direction and the vertical direction of the image.

Next in this example of the local sharpening process 50, a sharpener filter is applied to each of the skin tone pixels at 54 separately to sharpen the image of the skin regions so that details in the skin areas of the image can be better preserved or enhanced.

A number of different types and configurations for the sharpener filter are possible. For example, the size of the filter and/or the multiplying coefficients of the filter (see below) may be different in different set-ups and/or may be varied, optionally on-the-fly, within a specific set-up depending on the specific nature of the image and the particular properties of the skin tone pixels that are being processed. That is, the sharpener filter may be different for each pixel that is being processed.

Moreover, it is common for each pixel in an image to be formed of a number of "sub-pixels" of different colours. For example, it is common for there to be red, green and blue sub-pixels in an RGB system which are arranged so as to produce the range of visible colours. Other systems may also have sub-pixels for other colours, including for example so-called RGBY which also has yellow pixels and so-called RGBW which also has white sub-pixels. Other arrangements for sub-pixels are known. In such cases, the sharpener filter that is applied may be different for each sub-pixel that is being processed.

The sharpener filter applied at 54 to each of the skin tone pixels may adjust the intensity of the output of the pixel (or, more specifically, the sub-pixels in this example) as a function of the intensities of the (sub-) pixels in the neighbourhood of the (sub-) pixel. The intensity of a pixel may have a value in the range 0 to 255 for example.

Filters used in image processing are commonly visualised as a matrix of coefficients. An example sharpener filter matrix is shown in FIG. 3. The sharpener filter operates to adjust peaking gain, overshoot and undershoot to provide appropriate and visually appealing sharpening of the skin tone regions. In the present context, overshoot and undershoot are terms that relate particularly to the quality of edges in the skin regions of the image as it is the edges that need to be preserved in order for details in the skin regions to be preserved. Overshoot means edge transition artefacts that are caused by a high frequency peak in the sharpness response: the output value for a pixel is higher than the maximum input value. Undershoot means edge transition artefacts that are caused by a low frequency peak of sharpness response: the output value for a pixel is lower than the minimum input value. The degree of adjustment can be varied by increasing or decreasing the values of the coefficients of the matrix filter that is applied to the different (sub-) pixels in turn.

The example sharpener filter matrix shown in FIG. 3 is basically a 5×5 matrix. The central coefficient $C_0$ is the coefficient that is used to multiply the intensity of the (sub-) pixel that is being processed (the target or reference pixel). In this example, the sharpener filter matrix is symmetric in the horizontal, vertical and diagonal directions respectively. In this example, the first horizontally adjacent coefficients $C_1$ are applied to multiply the (sub-) pixels immediately to the left and right of the target pixel, and the next horizontally adjacent coefficients $C_3$ are applied to multiply the intensity of the (sub-) pixels immediately to the left and right of those left and right pixels respectively. Likewise, the vertically adjacent coefficients $C_5$, $C_6$ are applied to multiply the intensity of the immediately vertically adjacent and subsequent vertical pixels respectively. The diagonally adjacent coefficients $C_2$ are applied to multiply the intensity of the immediately diagonally adjacent pixels. Last for this, the coefficients $C_4$ are applied to multiply the intensity of the pixels in the rows above and below the target pixel and displaced by two pixels to the left and right of the target pixel. Those multiplied values from each of the pixels in the neighbourhood of the target pixel and for the target pixel itself are then summed to output the new intensity of the target (sub-) pixel that is being processed.

The process is repeated by applying the sharpener filter to each of the (original) skin tone pixels separately in turn. In this way, a new intensity is obtained for each of the skin tone (sub-) pixels. The effect of this is to preserve and even enhance details in the skin areas of the image. This can in particular overcome the loss of details in the skin tone regions which can otherwise arise during HDR processing.

As mentioned, the size of the filter and/or the values of the multiplying coefficients of the filter may be different in different set-ups and/or may be varied, optionally on-the-fly, within a specific set-up depending on the specific nature of the image and the particular properties of the skin tone pixels that are being processed. That is, in general, the sharpener filter may be different for each pixel that is being processed. The filter may be a square or rectangular filter and may in general be symmetric or not symmetric in one or more of the horizontal, vertical and diagonal directions. In the example shown, the filter has blanks (or equivalently coefficients of zero value) at some locations such that the filter has a cross-like or frustoconical structure. Moreover, the user maybe provided with an option, via for example a user interface presented for display to the user, to enable the degree of local sharpening that is applied to the at least some of the skin tone pixels to be adjusted by a user. For example, the user may be able to set the degree of sharpening as OFF, Low, Medium, High, etc. The user's selection causes the filter coefficients of the sharpener filter applied at 54 to each of the skin tone pixels to be set accordingly, to achieve greater or lesser sharpening as required.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware)

for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer-implemented method of processing an image formed of pixels, the method comprising:
   receiving an image that is one image of a plurality of images that make up a video sequence, wherein the plurality of images that make up the video sequence have been subject to high dynamic range (HDR) image processing such that the image is a HDR image;
   detecting skin tone pixels in the HDR image;
   applying local contrast enhancement to the skin tone pixels;
   adjusting colour of the skin tone pixels;
   after the applying local contrast enhancement to the skin tone pixels and the adjusting colour of the skin tone pixels, applying local sharpening to at least some of the skin tone pixels; and
   regenerating the HDR image using the locally sharpened skin tone pixels.

2. A method according to claim 1, wherein the local sharpening is applied to all of the skin tone pixels.

3. A method according to claim 2, wherein the regenerated image consists of the locally sharpened skin tone pixels and the original non-skin tone pixels.

4. A method according to claim 1, wherein the applying local sharpening to at least some of the skin tone pixels comprises applying at least one of an anti-aliasing filter and a sharpener filter to the at least some of the skin tone pixels.

5. A method according to claim 1, wherein the skin tone pixels comprise separate sub-pixels and the applying local sharpening to at least some of the skin tone pixels comprises applying the local sharpening separately to each sub-pixel of the least some of the skin tone pixels.

6. A non-transitory computer-readable storage medium comprising computer program instructions stored thereon such that when the computer program is executed on a computer device, the computing device is arranged to carry out a method according to claim 1.

7. A method according to claim 1, wherein the applying local contrast enhancement uses at least one of unsharp masking and a histogram approach.

8. A method according to claim 1, wherein the adjusting colour of the skin tone pixels uses tone mapping.

9. A processing system for processing an image formed of pixels, the processing system being constructed and arranged to:
   receive an image that is one image of a plurality of images that make up a video sequence, wherein the plurality of images that make up the video sequence have been subject to high dynamic range (HDR) image processing such that the image is a HDR image;
   detect skin tone pixels in the HDR image;
   apply local contrast enhancement to the skin tone pixels;
   adjust colour of the skin tone pixels;
   after applying local contrast enhancement to the skin tone pixels and adjusting colour of the skin tone pixels, apply local sharpening to at least some of the skin tone pixels; and
   regenerate the HDR image using the locally sharpened skin tone pixels.

10. A processing system according to claim 9, arranged such that the applying local sharpening to at least some of the skin tone pixels comprises applying at least one of an anti-aliasing filter and a sharpener filter to the at least some of the skin tone pixels.

11. A processing system according to claim 10, arranged such that the regenerated image consists of the locally sharpened skin tone pixels and the original non-skin tone pixels.

12. A processing system according to claim 9, arranged to enable a degree of local sharpening that is applied to the at least some of the skin tone pixels to be adjusted by a user.

13. A processing system according to claim 9, arranged such that the local sharpening is applied to all of the skin tone pixels.

* * * * *